H. S. MORGAN.
STEERING WHEEL.
APPLICATION FILED AUG. 7, 1914.
1,220,877.
Patented Mar. 27, 1917.
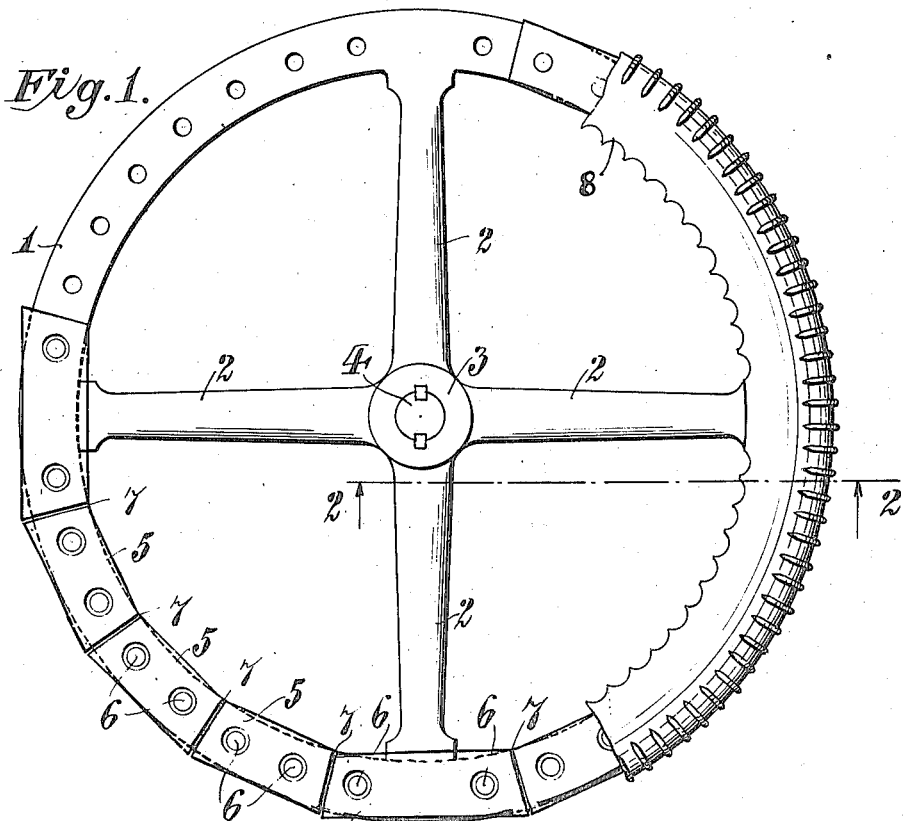
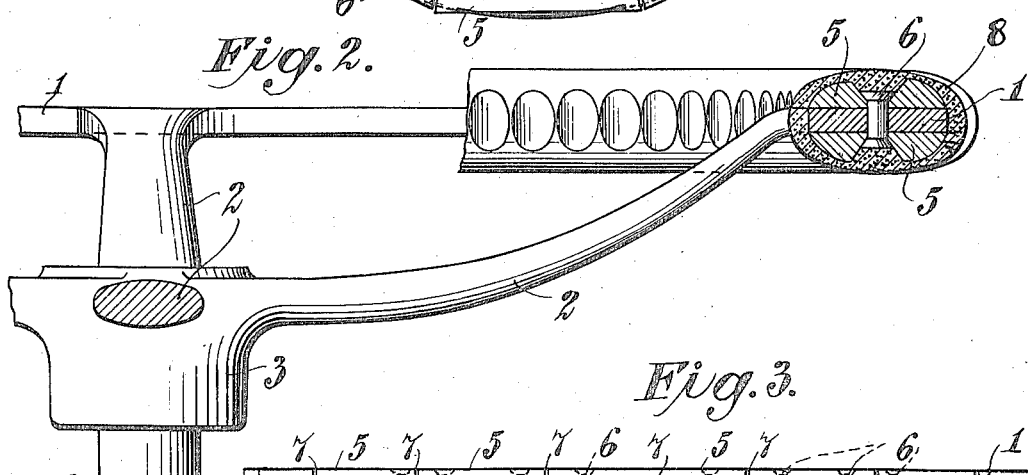
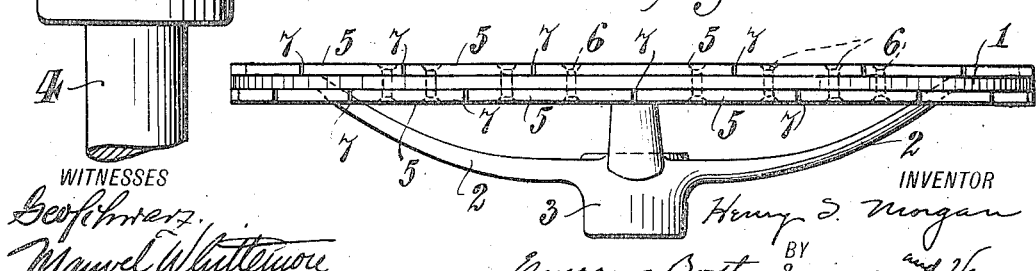

UNITED STATES PATENT OFFICE.

HENRY S. MORGAN, OF TRENTON, NEW JERSEY, ASSIGNOR TO POUVAILSMITH CORPORATION, OF POUGHKEEPSIE, NEW YORK, A CORPORATION OF NEW YORK.

STEERING-WHEEL.

1,220,877.      Specification of Letters Patent.      Patented Mar. 27, 1917.

Application filed August 7, 1914. Serial No. 855,596.

*To all whom it may concern:*

Be it known that I, HENRY S. MORGAN, a citizen of the United States, and a resident of Trenton, Mercer county, State of New Jersey, have invented an Improvement in Steering-Wheels, of which the following description, in connection with the accompanying drawings, is a specification, like letters on the drawings representing like parts.

The present invention relates to steering wheels, the object being to provide at reasonable cost an improved wheel of great durability and capable of resisting extremes of temperature.

I have illustrated one embodiment of my invention in the drawings accompanying the present specification, in which—

Figure 1 is a plan view of a steering wheel with the exterior covering partly removed;

Fig. 2 is a view in vertical cross section on the line 2—2 of Fig. 1, and

Fig. 3 is an elevation showing a modified arrangement of filler strips.

Referring to the drawings, 1 represents the rim frame of a steering wheel, which further comprises spider arms 2 and a collar 3 adapted to be connected with a steering post 4. The rim frame referred to is ordinarily made of metal, preferably aluminum to minimize its weight, and may form the base of the improved steering wheel rim which is shaped to fit the hand conveniently for operation. To produce a shape and bulk suitable for this purpose, at the same time retaining the necessary strength and lightness, I build up the said rim by means of filler which may conveniently be utilized in the shape of strips 5 applied as a layer on each side of the rim frame and fastened thereto by suitable means, here shown as rivets 6, Fig. 2. The filler strips referred to may be made of wood embossed sheet metal or of other suitable material, preferably, however, of a permeable material of fibrous or porous texture.

In the embodiment of my invention illustrated in the drawings, the layers of filler are shown as discontinuous or as comprising separate strips of wood with spaces 7 between them. To bind the rim frame and the said pieces of wood into a solid piece, I inclose the same in a coating of moldable material 8, preferably one which is unaffected by extreme ranges of temperature and which at the same time will endure considerable wear and vibration, such, for example, as bakelite or condensite, either of which, when molded around said frame and filler strips, effectively fills the spaces between the said strips and penetrates the pores in the wood or other porous material so that when it hardens, the outward appearance of the finished rim is that of a homogeneous mass which may be colored to resemble wood or hard rubber. In Fig. 3, I have illustrated a modified form of steering wheel embodying my invention, in which the separate strips 5, on each side of the rim frame 1 overlap the spaces 7 between said strips on the opposite side, so that said spaces are arranged in staggered relation.

The present device is designed to meet the demand for a durable steering wheel which may have the appearance of wood or hard rubber wheel without the defects of these materials. It has been found that hard rubber has a tendency to crack and break away from the frame at low temperatures and has therefore proven to be ill adapted to this particular use in climates where low temperature occurs. It is well known that neither bakelite nor condensite is thus affected by similarly low temperature and either would therefore provide a suitable material for use in some structures where hard rubber has heretofore been unsuccessfully tried out. But, in the matter of making steering wheels, the bare substitution of bakelite or condensite for hard rubber is at present commercially impracticable on account of the prohibitive cost of these materials. Thus, to utilize these materials economically, I have devised the present structure which provides a cold proof and wear resisting steering wheel at an expense substantially less than that of wheels containing hard rubber. A wheel constructed in the manner hereinabove described may be made to withstand extremely low temperatures without cracking or breaking away from the metallic rim frame and the filler strips. The latter serve the double purpose of providing comparatively inexpensive filler and of permitting a construction which may combine great strength and elasticity with economy in weight of the comparatively expensive covering material. I prefer to form the filler strips out of material having such permeability that the moldable covering medium may readily be made to penetrate the pores thereof under pressure in the mold. It is contemplated, however, that other material besides wood may be used to form the filler strips and that the covering mediums here referred to as bakelite or condensite may be replaced by any suitable covering medium without departing from the spirit of my invention.

I claim as my invention:

1. A steering wheel comprising in combination rim supporting means, a core for the rim containing permeable material, and a rim cover of molded plastic material united to said core by entering the said permeable material thereof.

2. A steering wheel comprising in combination with a hub and rim supporting arms, a rim core containing a wood filler and a condensite cover molded thereon under pressure.

3. A steering wheel comprising in combination with a hub and rim supporting arms, a rim core containing a plurality of pieces of wood and a cover of plastic material molded thereon under pressure so as to cause said material to permeate said wood and to be forced between the pieces of wood.

In testimony whereof, I have signed my name to this specification, in the presence of two subscribing witnesses, this 6th day of Aug., 1914.

HENRY S. MORGAN.

Witnesses:
MANVEL WHITTEMORE,
JOHN W. THOMPSON.